J. Shaerer,
Boring Hubs.
No 170. A.I. Patented July 14, 1857.
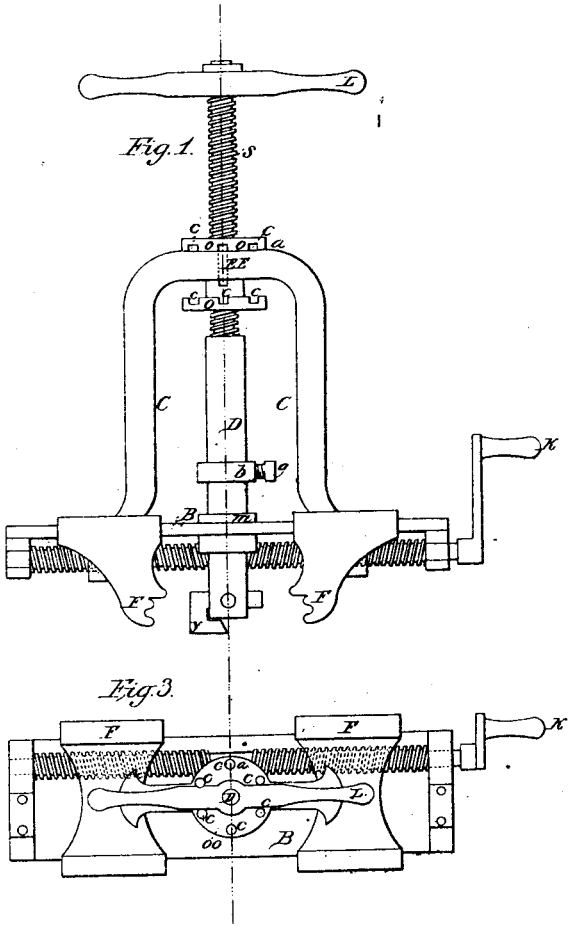
Witnesses:
Wm Schomm
M Hum
Inventor:
John Shaerer

DEPARTMENT OF COMMERCE
UNITED STATES PATENT AND TRADEMARK OFFICE

---

MISSING PAGE(S)

PATENT NUMBER AI 170 FOR THE ISSUE DATE 07/14/1857 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims